(12) United States Patent
Bernstein et al.

(10) Patent No.: US 8,019,970 B2
(45) Date of Patent: *Sep. 13, 2011

(54) THREE-DIMENSIONAL NETWORKING DESIGN STRUCTURE

(75) Inventors: Kerry Bernstein, Underhill, VT (US);
Timothy J. Dalton, Ridgefield, CT (US);
Marc R. Faucher, South Burlington, VT (US); Peter A. Sandon, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 833 days.

This patent is subject to a terminal disclaimer.

(21) Appl. No.: 11/946,422

(22) Filed: Nov. 28, 2007

(65) Prior Publication Data

US 2009/0138581 A1 May 28, 2009

(51) Int. Cl.
*G06F 9/00* (2006.01)
(52) U.S. Cl. ........................................................ 712/11
(58) Field of Classification Search ........................ None
See application file for complete search history.

(56) References Cited

U.S. PATENT DOCUMENTS

| | | |
|---|---|---|
| 5,235,672 A | 8/1993 | Carson |
| 5,471,580 A | 11/1995 | Fujiwara et al. |
| 5,834,162 A | 11/1998 | Malba |
| 6,104,082 A | 8/2000 | Berlin et al. |
| 6,269,467 B1 * | 7/2001 | Chang et al. ................... 716/1 |
| 6,441,476 B1 | 8/2002 | Emoto |
| 6,622,233 B1 | 9/2003 | Gilson |
| 6,738,891 B2 | 5/2004 | Fujii et al. |
| 6,836,815 B1 | 12/2004 | Purcell et al. |
| 6,901,491 B2 | 5/2005 | Kohn et al. |
| 6,987,760 B2 | 1/2006 | Calvignac et al. |
| 7,154,760 B2 | 12/2006 | Konishi et al. |
| 7,352,067 B2 | 4/2008 | Fukaishi et al. |
| 7,633,155 B2 | 12/2009 | Sukegawa et al. |
| 2003/0015740 A1 | 1/2003 | Li et al. |
| 2005/0139978 A1 | 6/2005 | Hirose |
| 2005/0195808 A1 | 9/2005 | Chen et al. |

* cited by examiner

*Primary Examiner* — Eric Coleman

(74) *Attorney, Agent, or Firm* — Cantor Colburn LLP; Michael LeStrange

(57) ABSTRACT

A design structure embodied in a machine readable medium used in a design process includes a multi-layer silicon stack architecture having one or more processing layers comprised of one or more computing elements; one or more networking layers disposed between the processing layers, the network layer comprised of one or more networking elements, wherein each computing element comprises a plurality of network connections to adjacently disposed networking elements and each networking element may provide network access to a plurality of other computing elements through a single hop of the network.

15 Claims, 9 Drawing Sheets

THREE-DIMENSIONAL NETWORKING DESIGN STRUCTURE

CROSS-REFERENCE TO RELATED APPLICATIONS

This non-provisional U.S. patent application is co-pending with U.S. patent application Ser. No. 11/382,967, which was filed May 12, 2006, and is assigned to the present assignee.

BACKGROUND

1. Technical Field

The present disclosure relates generally to electrical and electronic circuits and more specifically to a design structure for a multi-layered silicon structure including multiple compute and networking elements.

2. Description of the Related Art

Currently, complex computing systems are comprised of discrete computing elements and networking elements that are interconnected by a system of cables and switches. For example, a web server farm may include several two-way servers that are interconnected with discrete cables and switches. The web server farm can be shrunk into a blade server package of two-way server blades that are plugged into a backplane that includes embedded network links and switches. Further miniaturization of such complex systems is possible but it requires the use of an expensive single piece of silicon or multi-chip packages. Recent developments in silicon structures have enabled the construction of computer structures that were formerly impractical or prohibitively expensive to build.

In addition, as a result of the design of current complex computer systems, a failure of one or more components of the complex computing systems will likely suspend the operation of the entire complex system. Therefore, what is needed is a system architecture in which the failure of one or more components in the system will not result in suspension of the operation of the system.

SUMMARY

The shortcomings of the prior art are overcome and additional advantages are provided through the use of multi-layer silicon stack architectures that implement a redundant network of redundant processors.

Exemplary embodiments include a design structure embodied in a machine readable medium used in a design process, including a multi-layer silicon stack architecture having one or more processing layers comprised of one or more computing elements; one or more networking layers disposed between the processing layers, the network layer comprised of one or more networking elements, wherein each computing element comprises a plurality of network connections to adjacently disposed networking elements and each networking element may provide network access to a plurality of other computing elements through a single hop of the network.

In other exemplary embodiments, a design structure embodied in a machine readable medium used in a design process includes a multi-layer silicon stack architecture having one or more processing layers comprised of one or more computing elements; one or more networking layers disposed between the processing layers, the network layer comprised of one or more networking elements, wherein each computing element comprises a plurality of network connections to adjacently disposed networking elements, each computing element is connected to a plurality of networking elements, each networking element is connected to a plurality of computing elements, the computing elements the networking elements are connected by one or more serial or parallel connections, the computing elements include a processor chip, the networking elements include a switch chip and an edge switch chip, the edge switch chip is connected to two processor chips, the networking elements further include a switch chip on a third layer, the switch chip on a third layer is connected to four switch chips on a second layer, and each networking element may provide network access to up to eight other computing elements through a single hop of the network.

In other exemplary embodiments, a design structure embodied in a machine readable medium used in a design process includes a multi-layer silicon stack architecture having a first and second processing layer each comprised of one or more computing elements; a networking layer disposed between the first and second processing layers, the network layer comprised of one or more networking elements, wherein each computing element comprises a plurality of network connections to adjacently disposed networking elements, each computing element is connected to a plurality of networking elements, each networking element is connected to a plurality of computing elements, the computing elements the networking elements are connected by one or more serial or parallel connections, the computing elements include a processor chip, the networking elements include a switch chip and an edge switch chip, the edge switch chip is connected to two processor chips, the networking elements further include a switch chip on a third layer, the switch chip on a third layer is connected to four switch chips on a second layer, and each networking element may provide network access to up to eight other computing elements through a single hop of the network.

TECHNICAL EFFECTS

As a result of the summarized invention, technically we have achieved a solution that provides a high-density partial mesh network with many network links between compute elements.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Referring now to the Figures for the purpose of illustration, it is to be understood that standard components or features that are within the purview of an artisan of ordinary skill and do not contribute to the understanding of the various exemplary embodiments are omitted from the Figures to enhance clarity.

In exemplary embodiments, a design structure for three-dimensional interconnect network structure is comprised of layers of processing or compute elements, which are layered with networking or switch elements. Each compute element can include several network connections to adjacent networking elements (e.g., networking elements disposed either above or below) forming a three-dimensional structure. In one embodiment, a compute element (e.g., a processor chip with one or more compute cores) is tied to four switch elements or chips that are disposed above the compute element. Each switch element may provide network access to up to eight other computing elements through a single hop of the network.

Figure 1A:
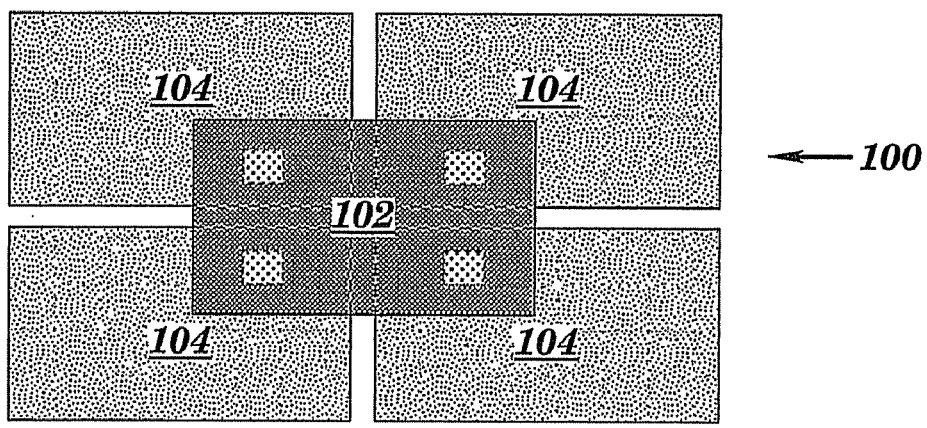
FIGS. 1a-c illustrate a three dimensional interconnect network structure in accordance with exemplary embodiments.
Figure 1B:
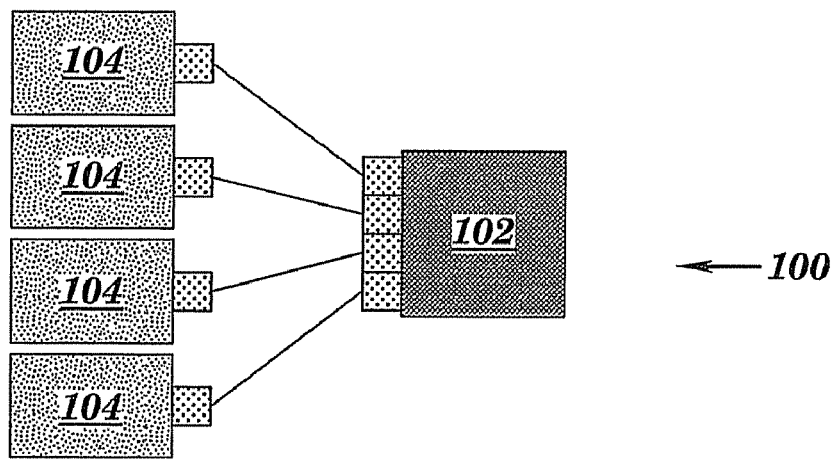
Figure 1C:
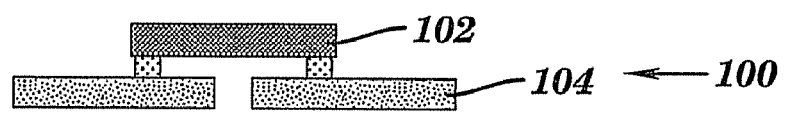

Referring now to FIG. 1a-c, a three-dimensional interconnect network structure in accordance with exemplary embodiments is illustrated generally as 100. FIG. 1a depicts a top view of the three-dimensional interconnect network structure 100, FIG. 1b depicts a network view of the three-dimensional interconnect network structure 100, and FIG. 1c depicts a side elevational view of the three-dimensional interconnect network structure 100. The three-dimensional interconnect network structure 100 includes a switch chip 102 and a plurality of processor chips 104. Each of the processor chips 104 is directly connected to the switch chip 102 with one or more redundant network connections.

Figure 2A:
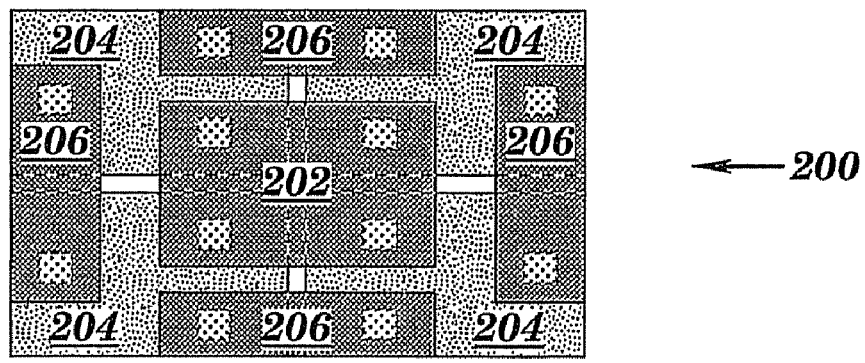
FIGS. 2a-d illustrate a three dimensional interconnect network structure with full tiling and edge switch elements in accordance with exemplary embodiments.
Figure 2B:
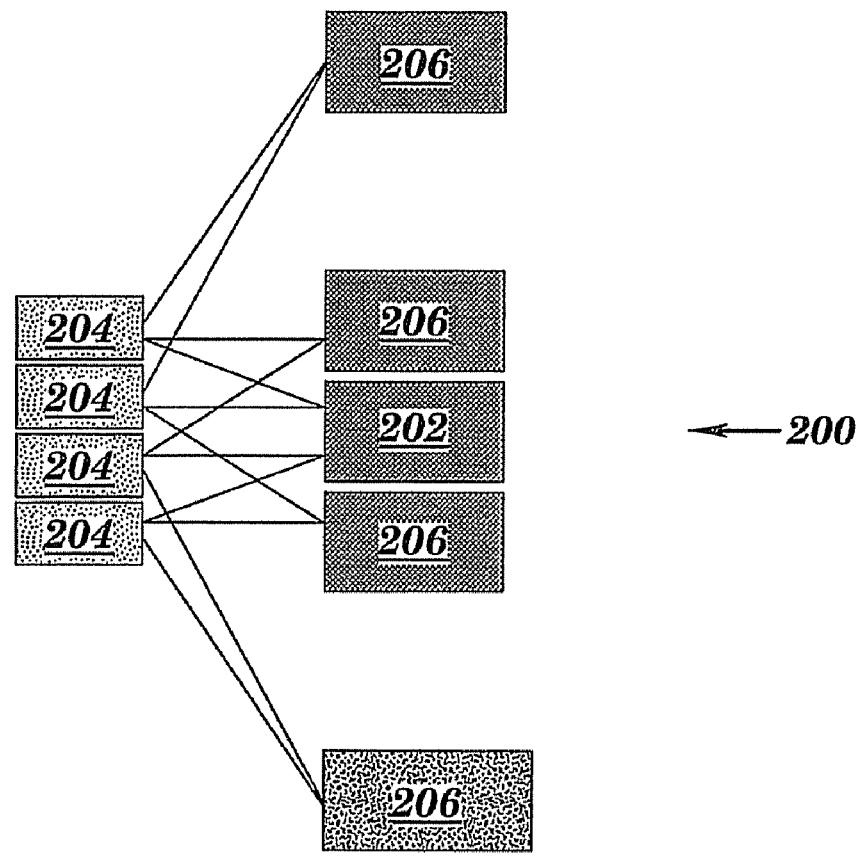
Figure 2C:
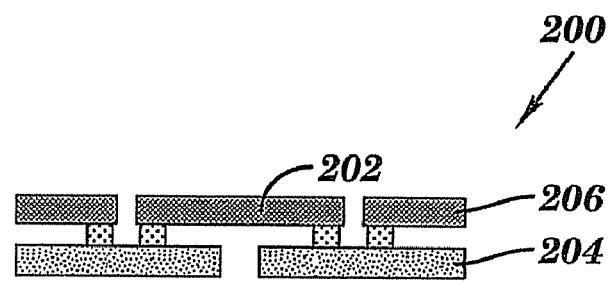
Figure 2D:
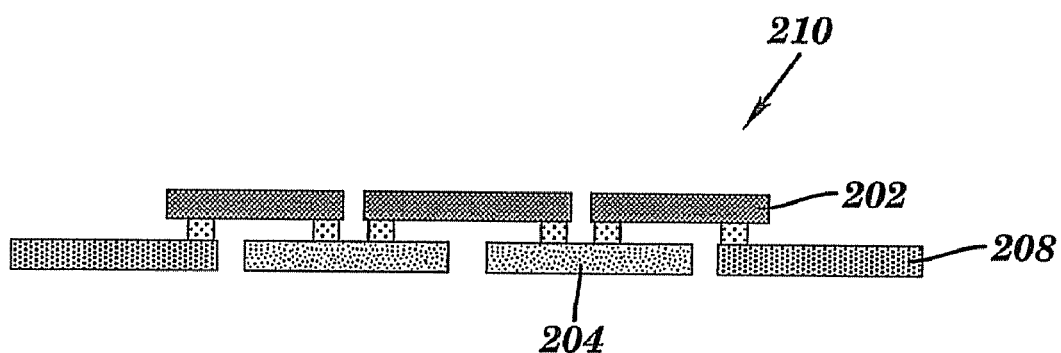

Turning now to FIG. 2a-d, a three-dimensional interconnect network structure with full tiling and edge switch elements in accordance with exemplary embodiments is illustrated generally as 200. FIG. 2a depicts a top view of the three-dimensional interconnect network structure 200, FIG. 2b depicts a network view of the three-dimensional interconnect network structure 200, and FIG. 2c depicts a side elevational view of the three-dimensional interconnect network structure 200. The three-dimensional interconnect network structure 200 includes switch chip 202, processor chips 204, and edge switch chips 206. The edge switch chips 206 add extra connections between the processor chips 204. In one embodiment, each switch chip 202 ties four processor chips 204 together and each edge switch chip 206 ties two processor chips 204 together. The edge switch chip 206 comprises a smaller version of the switch chip 202, having less connectivity as is appropriate to the edge of the array of processors and network elements. An alternative structure 210, shown in FIG. 2d, instead uses switch chips 202 at the edge of the array to communicate outside of this assembly via links 208. These switch chips can be identical to those used in the rest of the switching network, or might be designed specifically for the purpose of electrically or optically connecting external connections to the rest of the processor network. FIG. 2d depicts a side elevational view of a three-dimensional interconnect network structure 210 in which the edge switch elements of network structure 200 connect to elements external to this assembly.

Figure 3A:
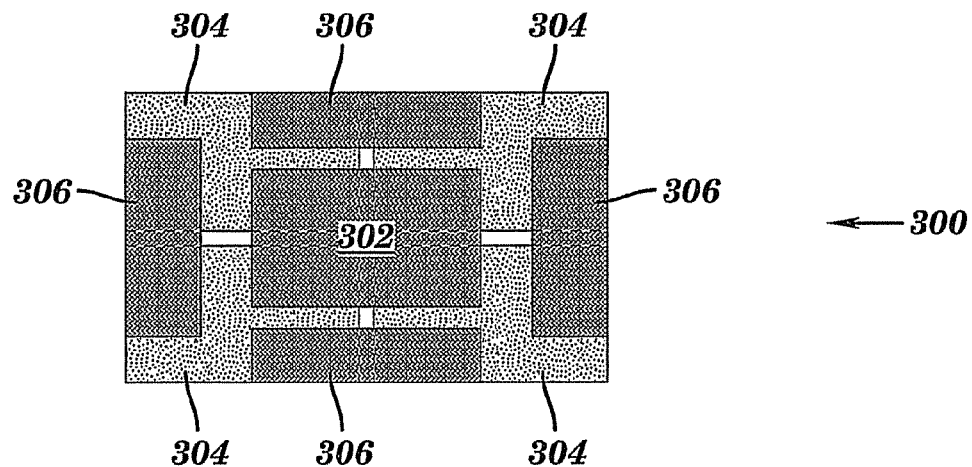
FIGS. 3a-c illustrate a three dimensional interconnect network structure with full tiling and edge network elements in accordance with exemplary embodiments.
Figure 3B:
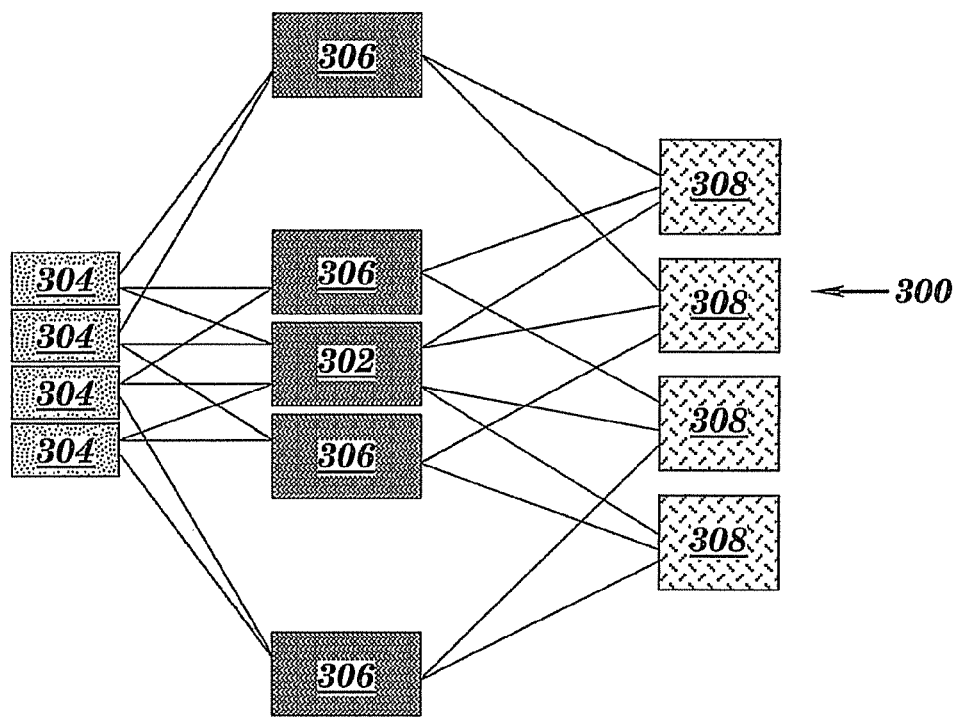
Figure 3C:
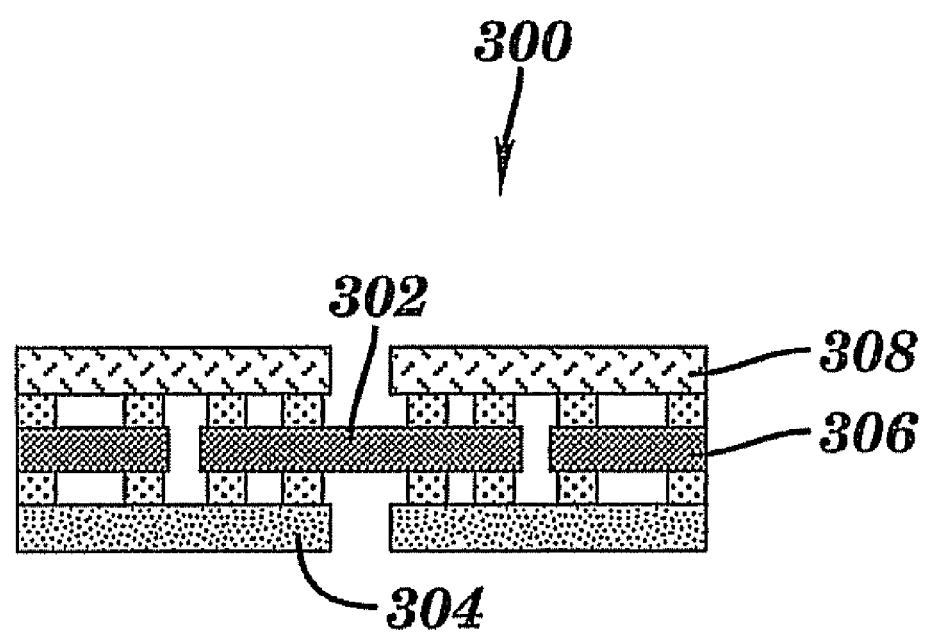

Referring now to FIG. 3a-c, a three-dimensional interconnect network structure with full tiling and edge network elements in accordance with exemplary embodiments is illustrated generally as 300. FIG. 3a depicts a top view of the three-dimensional interconnect network structure 300, FIG. 3b depicts a network view of the three-dimensional interconnect network structure 300, and FIG. 3c depicts a side elevational view of the three-dimensional interconnect network structure 300. The three-dimensional interconnect network structure 300 includes switch chip 302, processor chips 304, edge switch chips 306, and an additional layer of switch chips 308. The edge switch chips 306 add extra connections between the processor chips 304. Each switch chip on the third layer 308 includes one switch chip 302 connection and two switch chip 306 connections. Each switch chip 302 ties four processor chips 304 together. Each edge switch chip 306 ties two processor chips 304 together. The three-dimensional interconnect network structure 300 can tolerate any one network element failing.

Figure 4A:
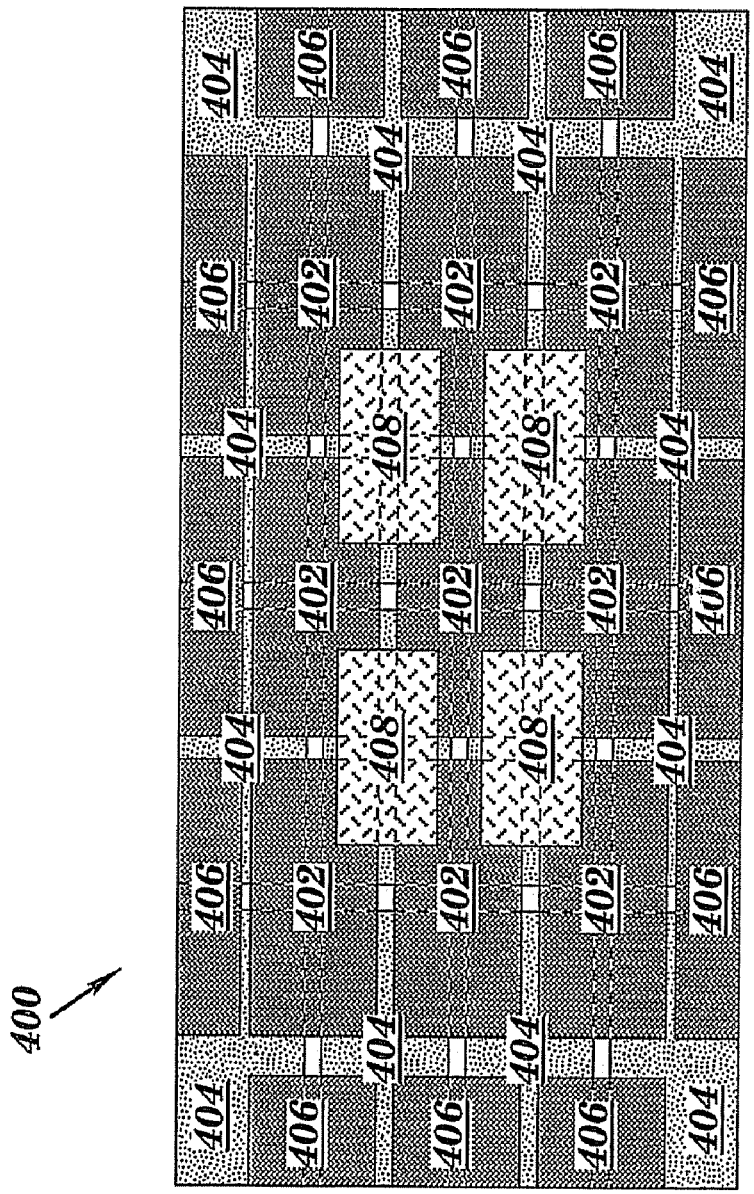
FIGS. 4a-c illustrate another three-dimensional interconnect network structure with full tiling and edge network elements in accordance with exemplary embodiments.
Figure 4B:
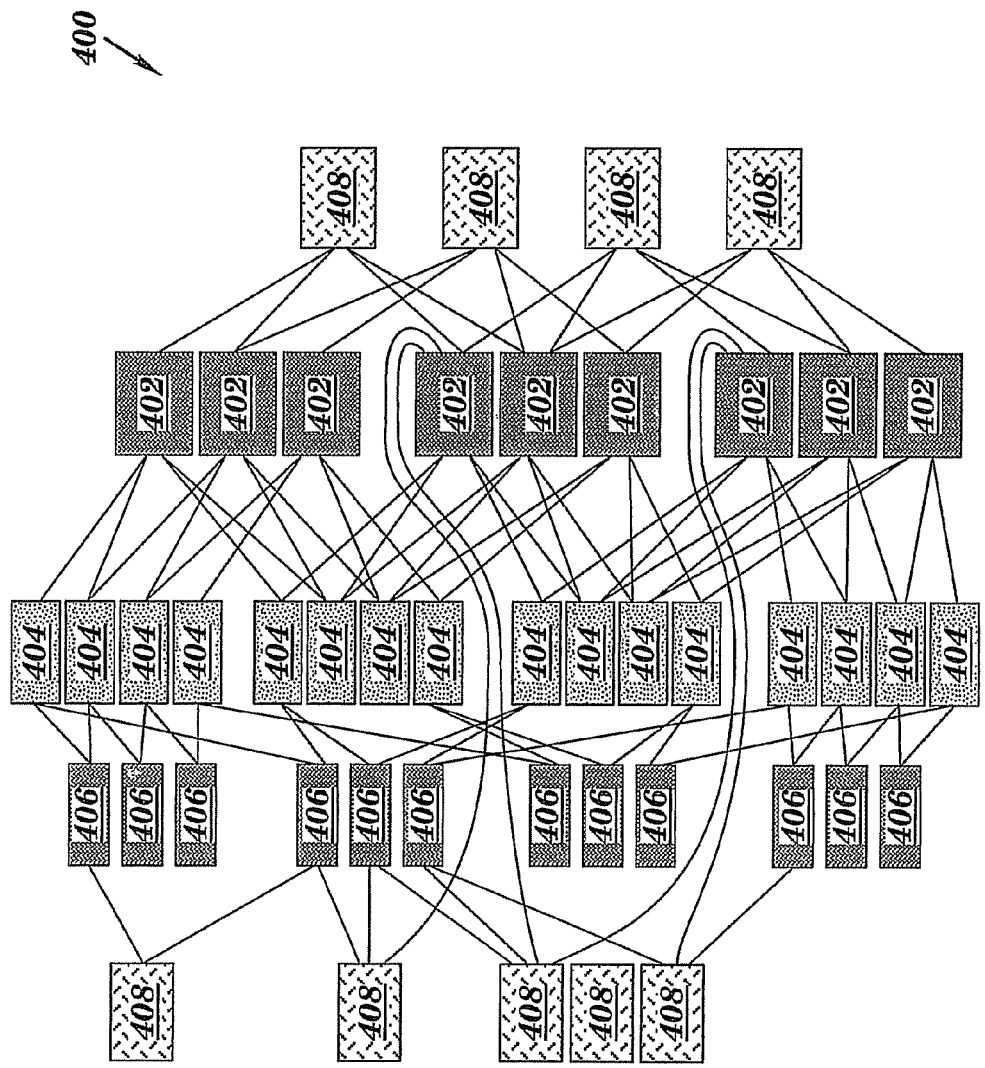
Figure 4C:
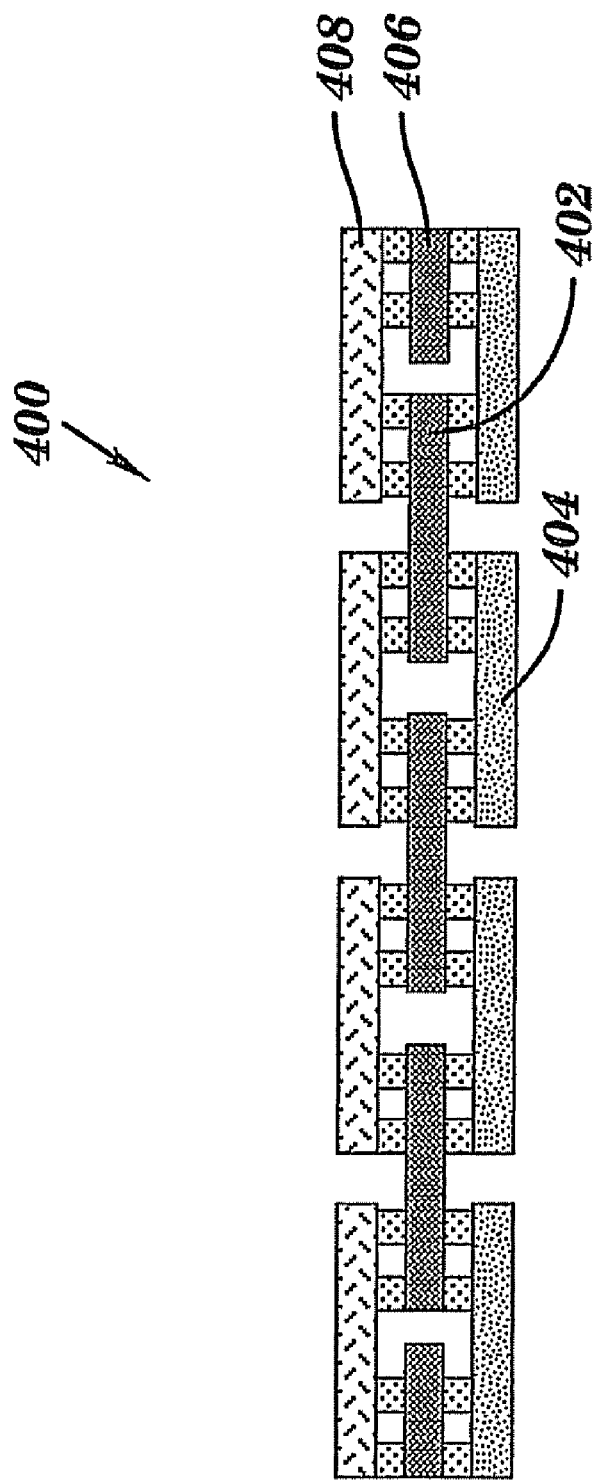

Turning now to FIG. 4, another three-dimensional interconnect network structure with full tiling and edge network elements in accordance with exemplary embodiments is illustrated generally as 400. FIG. 4a depicts a top view of the three-dimensional interconnect network structure 400, FIG. 4b depicts a network view of the three-dimensional interconnect network structure 400, and FIG. 4c depicts a side elevational view of the three-dimensional interconnect network structure 400. The three-dimensional interconnect network structure 400 includes switch chips 402, processor chips 404, edge switch chips 406, and an additional layer of switch chips 408. The three-dimensional interconnect network structure 400 provides significant bandwidth and redundancy. For purposes of clarity, not all connections and elements of the three-dimensional interconnect network structure 400 are shown in FIG. 4. Each processor chip 404 has four switch connections. Each switch chip 402 ties four processor chips together except for edge switch chips 406, which have two network connections. Switch chips 408 on the third layer connect four switch chips 402 or two edge switch chips 406 and two switch chips 402. As additional switch layers are added to the three-dimensional interconnect network structure 400, the mesh network capability of the network is increased. In other words the network becomes more tolerant of failed compute and network elements.

Figure 5:
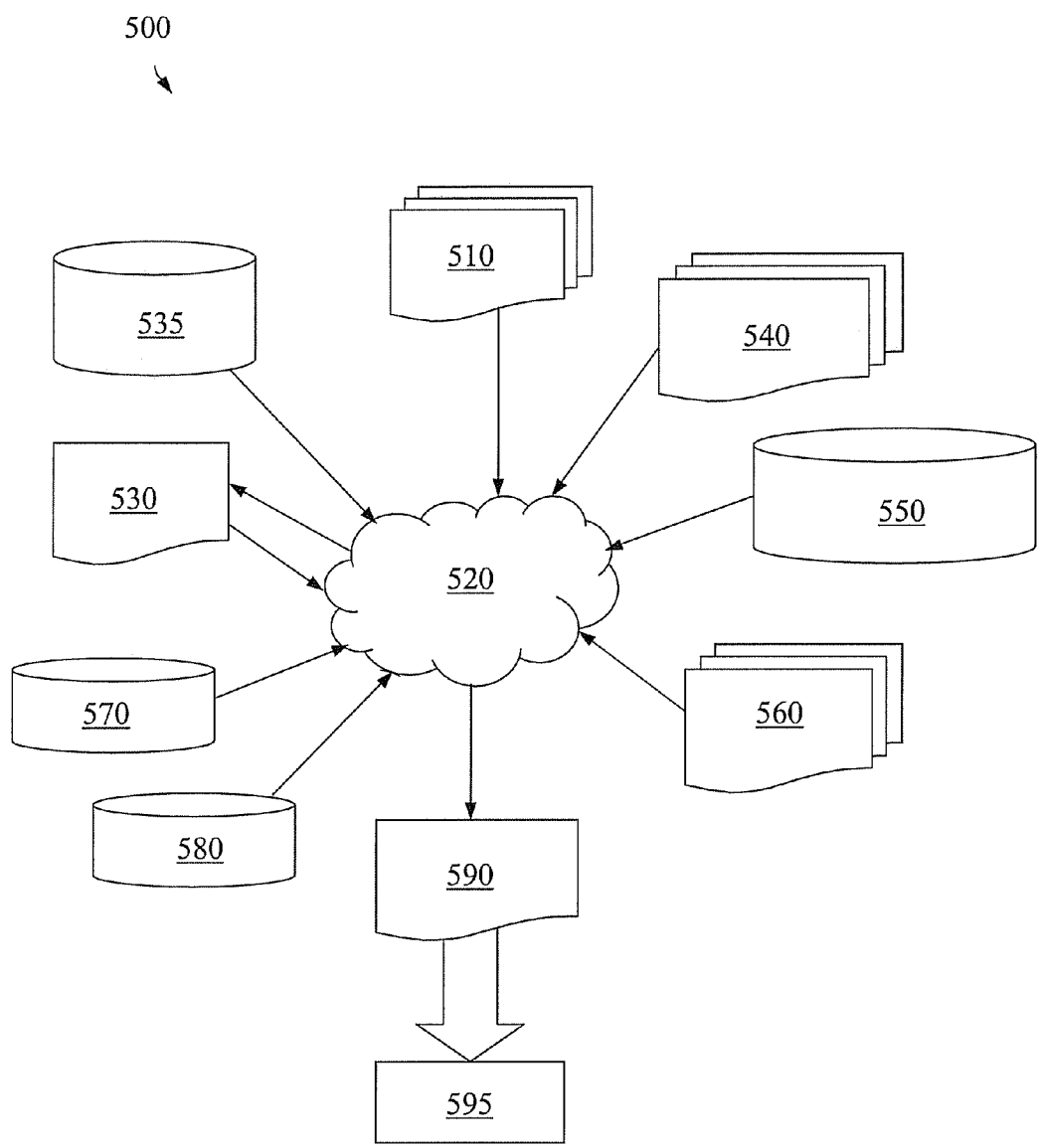
FIG. 5 is a flow diagram of an exemplary design process used in semiconductor design, manufacturing, and/or test.

FIG. 5 is a block diagram illustrating an example of a design flow 500. Design flow 500 may vary depending on the type of IC being designed. For example, a design flow 500 for building a switch chip 102 will differ from a design flow 500 for designing a processor chip 104. Design structure 510 is preferably an input to a design process 520 and may come from an IP provider, a core developer, or other design company or may be generated by the operator of the design flow, or from other sources. Design structure 510 comprises circuit embodiments 200, 300, 400 in the form of schematics or HDL, a hardware-description language, (e.g., Verilog, VHDL, C, etc.). Design structure 510 may be contained on one or more machine readable medium(s). For example, design structure 510 may be a text file or a graphical representation of circuit embodiments 200, 300, 400. Design process 520 synthesizes (or translates) circuit embodiments 200, 300, 400 into a netlist 530, where netlist 530 is, for example, a list of wires, transistors, logic gates, control circuits, I/O, models, etc., and describes the connections to other elements and circuits in an integrated circuit design and recorded on at least one of a machine readable medium. This may be an iterative process in which netlist 530 is resynthesized one or more times depending on design specifications and parameters for the circuit.

Design process 520 includes using a variety of inputs; for example, inputs from library elements 535 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 580, which may include test patterns and other testing information such as network configuration data for each of the switch chips 102 and program code for each of the processor chips 104. Design process 520 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 520 without deviating from the scope and spirit of the invention. The design structure of the invention embodiments is not limited to any specific design flow.

Design process 520 preferably translates embodiments of the invention as shown in FIGS. 2-3, along with any additional integrated circuit design or data (if applicable), into a second design structure 590. Second design structure 590 resides on a storage medium in a data format used for the exchange of layout data of integrated circuits (e.g. information stored in a GDSII (GDS2), GL1, OASIS, or any other suitable format for storing such design structures). Second design structure 590 may comprise information such as, for example, test data files, network configuration data files, initial processor program code files, design content files, manufacturing data, layout parameters, wires, levels of metal, vias, shapes, data for routing through the manufacturing line, and any other data required by a semiconductor manufacturer to produce embodiments of the invention as shown in FIGS. 2-3. Second design structure 590 may then proceed to a stage 595 where, for example, second design structure 590: proceeds to tape-out, is released to manufacturing, is released to a mask house, is sent to another design house, is sent back to the customer, etc.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A design structure embodied in a machine readable medium used in a design process, the design structure comprising:
    a multi-layer silicon stack architecture having one or more processing layers comprised of one or more computing elements;
    one or more networking layers disposed between the processing layers, the network layer comprised of one or more networking elements, the one or more networking elements including one or more links to an external network,
    wherein each computing element comprises a plurality of network connections to adjacently disposed networking elements and each networking element may provide network access to a plurality of other computing elements through a single hop of the network.

2. The design structure of claim 1, wherein each computing element is connected to a plurality of networking elements.

3. The design structure of claim 2, wherein each networking element is connected to a plurality of computing elements.

4. The design structure of claim 3, wherein the computing elements and the networking elements are connected by one or more serial or parallel connections.

5. The design structure of claim 4, wherein the computing elements include a processor chip.

6. The design structure of claim 5, wherein the networking elements include a switch chip and an edge switch chip.

7. The design structure of claim 6, wherein the edge switch chip is connected to a plurality of processor chips.

8. The design structure of claim 7, wherein the networking elements include a switch chip on a third layer.

9. The design structure of claim 8, wherein the switch chip on a third layer is connected to a plurality of switch chips on a second layer.

10. The design structure of claim 9, wherein the processing layers and the networking layers combine to form a three-dimensional structure.

11. The design structure of claim 1, wherein the design structure comprises a netlist describing the multi-layer silicon stack architecture.

12. The design structure of claim 1, wherein the design structure resides on a GDSII storage medium.

13. The design structure of claim 1, wherein the design structure includes test data files, characterization data, verification data, network configuration data, programming data, or design specifications.

14. A design structure embodied in a machine readable medium used in a design process, the design structure comprising:
    a multi-layer silicon stack architecture having one or more processing layers comprised of one or more computing elements;
    one or more networking layers disposed between the processing layers, the network layer comprised of one or more networking elements, the one or more networking elements including one or more links to an external network,
    wherein each computing element comprises a plurality of network connections to adjacently disposed networking elements,
    each computing element is connected to a plurality of networking elements, each networking element is connected to a plurality of computing elements,
    the computing elements and the networking elements are connected by one or more serial or parallel connections,
    the computing elements include a processor chip,
    the networking elements include a switch chip and an edge switch chip,
    the edge switch chip is connected to two processor chips,
    the networking elements further include a switch chip on a third layer,
    the switch chip on a third layer is connected to four switch chips on a second layer, and
    each networking element may provide network access to up to eight other computing elements through a single hop of the network.

15. A design structure embodied in a machine readable medium used in a design process, the design structure comprising:
    a multi-layer silicon stack architecture having a first and second processing layer each comprised of one or more computing elements;
    a networking layer disposed between the first and second processing layers, the network layer comprised of one or more networking elements,
    wherein each computing element comprises a plurality of network connections to adjacently disposed networking elements, the one or more networking elements including one or more links to an external network,
    each computing element is connected to a plurality of networking elements, each networking element is connected to a plurality of computing elements, the computing elements and the networking elements are connected by one or more serial or parallel connections,
the computing elements include a processor chip,
the networking elements include a switch chip and an edge switch chip,
the edge switch chip is connected to two processor chips,
the networking elements further include a switch chip on a third layer,
the switch chip on a third layer is connected to four switch chips on a second layer, and
each networking element may provide network access to up to eight other computing elements through a single hop of the network.

* * * * *